July 10, 1928.
C. J. JORDAN
1,677,095
METHOD AND APPARATUS FOR MANUFACTURING FIRE POLISHED SHEET GLASS
Filed Nov. 11, 1925   2 Sheets-Sheet 1
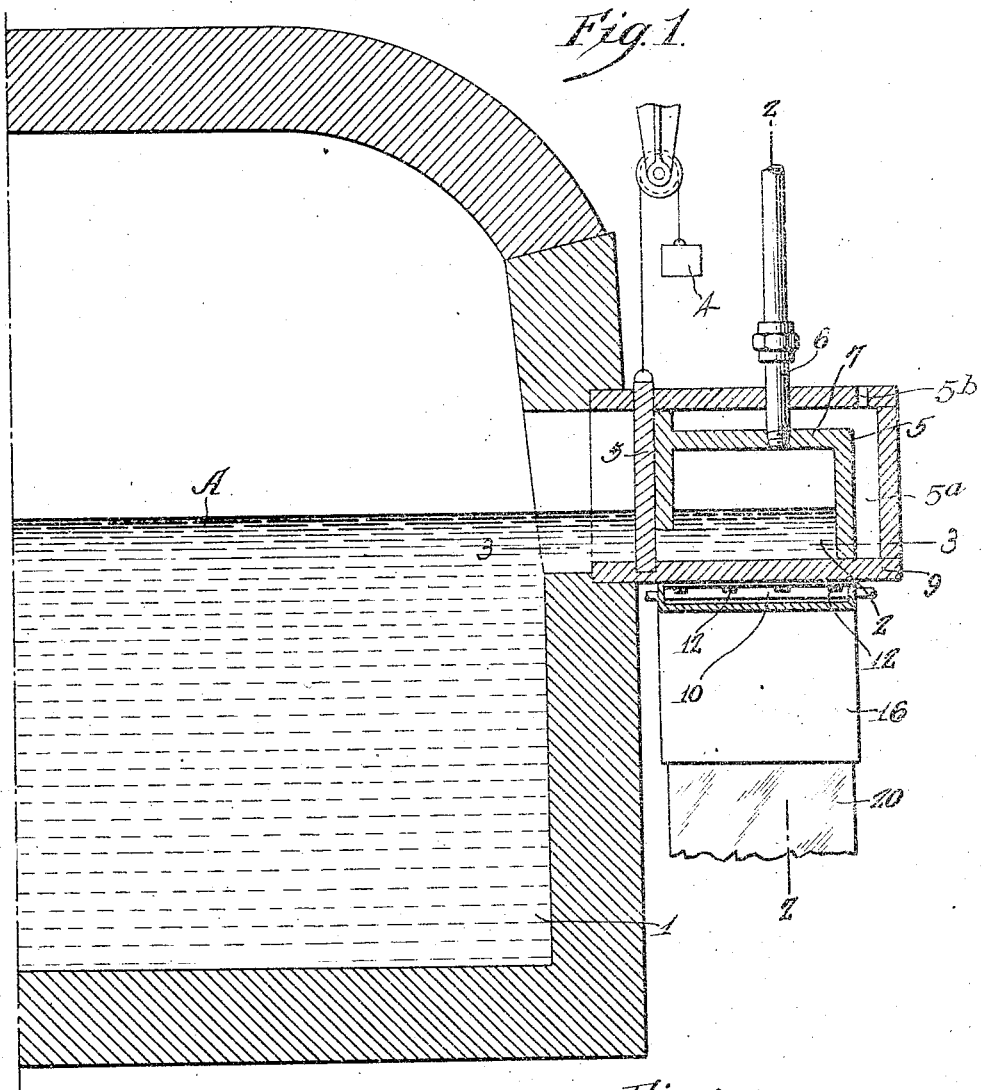
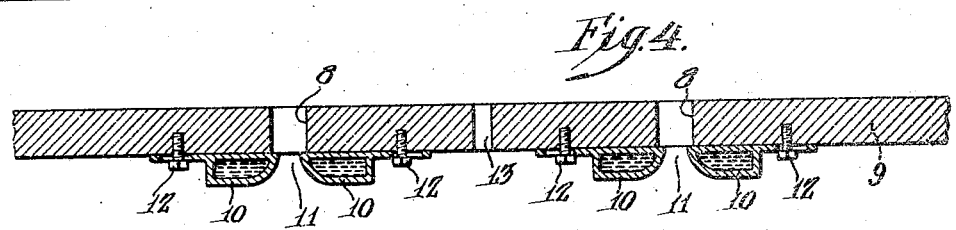
Charles J. Jordan
INVENTOR
BY Victor J. Evans
ATTORNEY
WITNESS:

July 10, 1928.

C. J. JORDAN 1,677,095

METHOD AND APPARATUS FOR MANUFACTURING FIRE POLISHED SHEET GLASS

Filed Nov. 11, 1925    2 Sheets-Sheet 2

Charles J. Jordan
INVENTOR

BY Victor J. Evans
ATTORNEY

WITNESS:

Patented July 10, 1928.

1,677,095

UNITED STATES PATENT OFFICE.

CHARLES J. JORDAN, OF WOODBURY, NEW JERSEY, ASSIGNOR OF ONE-FOURTH TO RUDOLPH G. SCHAUB, OF WOODBURY, NEW JERSEY.

METHOD AND APPARATUS FOR MANUFACTURING FIRE-POLISHED SHEET GLASS.

Application filed November 11, 1925. Serial No. 68,370.

This invention relates to a method of and apparatus for the manufacture of fire-polished sheet glass, and particularly glass of this type in which reinforcing wire is embedded.

Another object of the invention is to provide an apparatus for the purpose specified, in which the thickness of the sheet of glass may be regulated, and also in which the reinforcing wire will be embedded in the center of the finished sheet of glass.

In the present method of manufacturing glass reinforced by wire, the wire is embedded or forced into the sheet of glass by pressure resulting frequently in the uneven placing of wire in the glass, making the cost of manufacture of such glass relatively high, and also causing considerable waste. The present method comprises the directing of the molten glass in two sheets towards a converging point, and the feeding of the reinforcing wire to this point, causing the two thin sheets of glass to engage one upon each side of the reinforcing wire and fuse one with the other, forming a single sheet of fire polished wire reinforced glass of uniform thickness, and with the wire uniformly spaced therein, and also forming a sheet of glass of this type in which the polishing after finishing of the glass is illustrated.

Other objects of the invention will appear in the following detail description, and in the accompanying drawing, wherein:

Figure 1 is a fragmentary view of a furnace used for making glass, showing the improved apparatus applied thereto.

Figure 4 is an enlarged detail section of a part of the apparatus structure illustrating the means for regulating the thickness of the sheets of glass.

Figure 2:
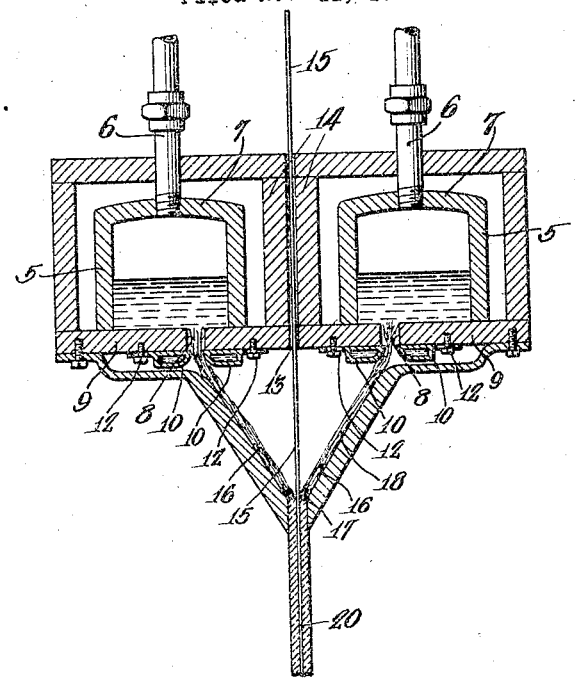
Figure 2 is a vertical cross section on the line 2—2 of Figure 1.

Referring more particularly to the drawings, 1 identifies a glass making furnace of approved type which has a discharging pot 2 attached thereto, and into which the molten glass, as indicated at A, flows. The flow of glass into the pot 2 is controlled by means of a vertically movable balanced gate 3, the said gate being balanced by a counterweight 4; the pot 2 is rectangular in shape, and it has a pair of air domes 5 mounted therein with their open ends downwardly. Air supply pipes 6 are connected to the crowns 7 of the domes 5, for admitting air under pressure into the pot 2 to force the molten glass out of the longitudinal slots 8, formed in the bottom 9 of the pot 2. The slots 8 are spaced from each other, and their active width is regulated by sliding members 10 which are adjustably mounted on the undersurface of the bottom 9, and are movable towards each other to regulate the width of the glass issuing opening, as shown at 11. Set screws 12 are provided for holding the members 10 in adjusted positions.

A wire receiving slot 13 is also formed in the bottom 9 of the pot 2, and is separated from the glass containing compartments of the pot 2 by suitable partitions 14. Sheet wire, as indicated at 15, such as is used in reinforcing sheet glass passes from a suitable roll (not shown) through the slot 13, which slot is positioned equi-distant from the slots 8. Inclined guides 16 are provided which extend downwardly and converge towards the wire 15, so as to guide the sheets of glass, as they are forced out of the slots 8 and through the space 11, towards the converging point 17; the wire 15 being directed equi-distant from the slots 8 will come between the sheets of glass, as indicated at 18 which are guided by the respective guides 16 one of the sheets engaging upon each side of the sheet of wire.

Figure 3:
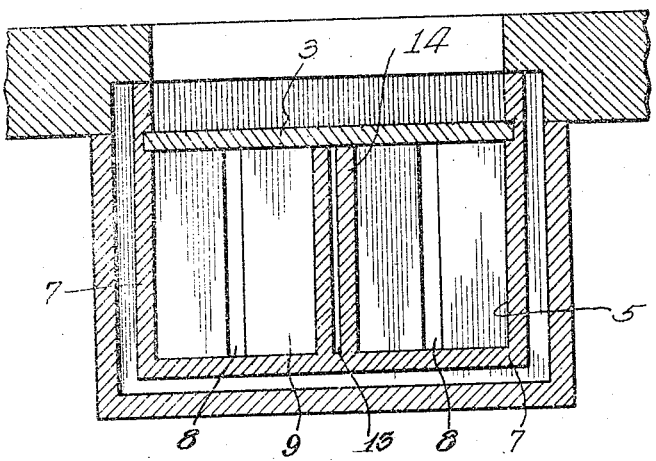
Figure 3 is a sectional view on line 3—3 of Figure 1.

Each time a sheet of glass with a reinforcing wire imbedded therein is formed the pot 2 is allowed to fill with molten glass from the furnace. The balanced gate 3 is then closed entirely as in Figure 1, thereby preventing retrogression of the molten glass back to the furnace. Since a portion of the wall of the pot is immediately in contact with one face of the gate, molten glass is prevented from passing between the gate and the wall of the pot, and due to the wall of the pot being constructed as shown in Figure 3, there is no chance for the molten glass to flow into the air space 5ª, the outer wall of such space having an air vent 5ᵇ. Air under pressure is then allowed to enter the pot 2, creating pressure on the glass and thereby materially aiding its passage through the slots 8, such air passing through the pipe 6 into the pot.

It will be understood, that the glass is in a slightly molten state so that when the two sheets 18 come together at the converging point 17, they will fuse or join in a single sheet with the wire 15 embedded in the center thereof, thereby providing fire polished sheet glass reinforced by the wire. The thickness of the resulting sheet, such as indicated at 20, may be regulated by adjustment of the members 10, which regulate the thickness of the sheets 18 which are forced from the pot 2 through the slots 8, and spaces 11 between the sliding members 10 by the air which enters the domes 5 under pressure.

It is, of course, to be understood, that the invention may be constructed in various other manners and the parts associated in different relations, and therefore, I do not desire to be limited in any manner, except as set forth in the claims hereunto appended.

What I claim is:

1. An apparatus for forming fire polished wire reinforced sheet glass consisting in a pot provided with a pair of spaced slots, and being in communication with a furnace, said pot provided with a third slot equi-distant of said first named slots, means for regulating the active width of said first named slots, guides extending diagonally from the first named slots and converging at a point remote from the pot and in alignment with said third slot, and air domes in said pot over said first named slots to apply air pressure to molten glass in the pot and means for controlling the communication between the pot and the furnace.

2. An apparatus for forming fire polished wire reinforced sheet glass consisting in a pot provided with a pair of spaced slots, and being in communication with a furnace said pot provided with a third slot equi-distant of said first named slots, means for regulating the active width of said first named slots, guides extending diagonally from the first named slots and converging at a point remote from the pot and in alignment with said third slot, air domes in said pot over said first named slots to apply air pressure to molten glass in the pot, and a gate for regulating the flow of glass into said pot and controlling the communication between the furnace and pot.

3. In an apparatus for constructing wire reinforced polished sheet glass, a pot having a pair of domes being in connection with and adapted to receive molten glass from a furnace, said pot having a central slot intermediate the domes and adapted for the passage of sheet wire fabric, said pot having a pair of additional slots equi-distantly spaced, one on each side of the central slot, means connecting the equi-distantly spaced slots and the central slot for convergently guiding the molten glass to the central slot and through which it passes fusing together and imbedding the wire mesh therein, and means for conducting air under pressure into said domes to feed the molten glass through the equi-distantly spaced slots.

4. In an apparatus for constructing wire reinforced polished sheet glass, a pot having a pair of domes being in connection with and adapted to receive molten glass from a furnace, said pot having a central slot intermediate the domes and adapted for the passage of sheet wire fabric, said pot having a pair of additional slots equi-distantly spaced, one on each side of the central slot, means connecting the equi-distantly spaced slots and the central slot for convergently guiding the molten glass to the central slot and through which it passes fusing together and imbedding the wire mesh therein, and means for conducting air under pressure into said domes to feed the molten glass through the equi-distantly spaced slots, means for closing communication between the domes and the furnace while the compressed air is acting upon the molten glass, and means for regulating the active width of the equi-distantly spaced slots.

5. A method for constructing wire reinforced polished glass, consisting in causing the flow of molten glass and in shaping the glass into sheets at two equi-distantly spaced points, converging the molten sheets to a fusing point, feeding and directing a sheet of wire fabric between the sheets of molten glass at their fusing point, and injecting air under pressure upon the surface of the molten glass as it feeds and shapes into sheets.

6. In an apparatus for constructing polished sheet glass, a pot having an air dome being in connection with and adapted to receive molten glass from a furnace, said dome having an outlet slot, the passage of glass therethrough forming into a polished sheet, and means for conducting air under pressure into the dome and upon the surface of the molten glass.

In testimony whereof I affix my signature.

CHARLES J. JORDAN.